United States Patent Office 3,127,922
Patented Apr. 7, 1964

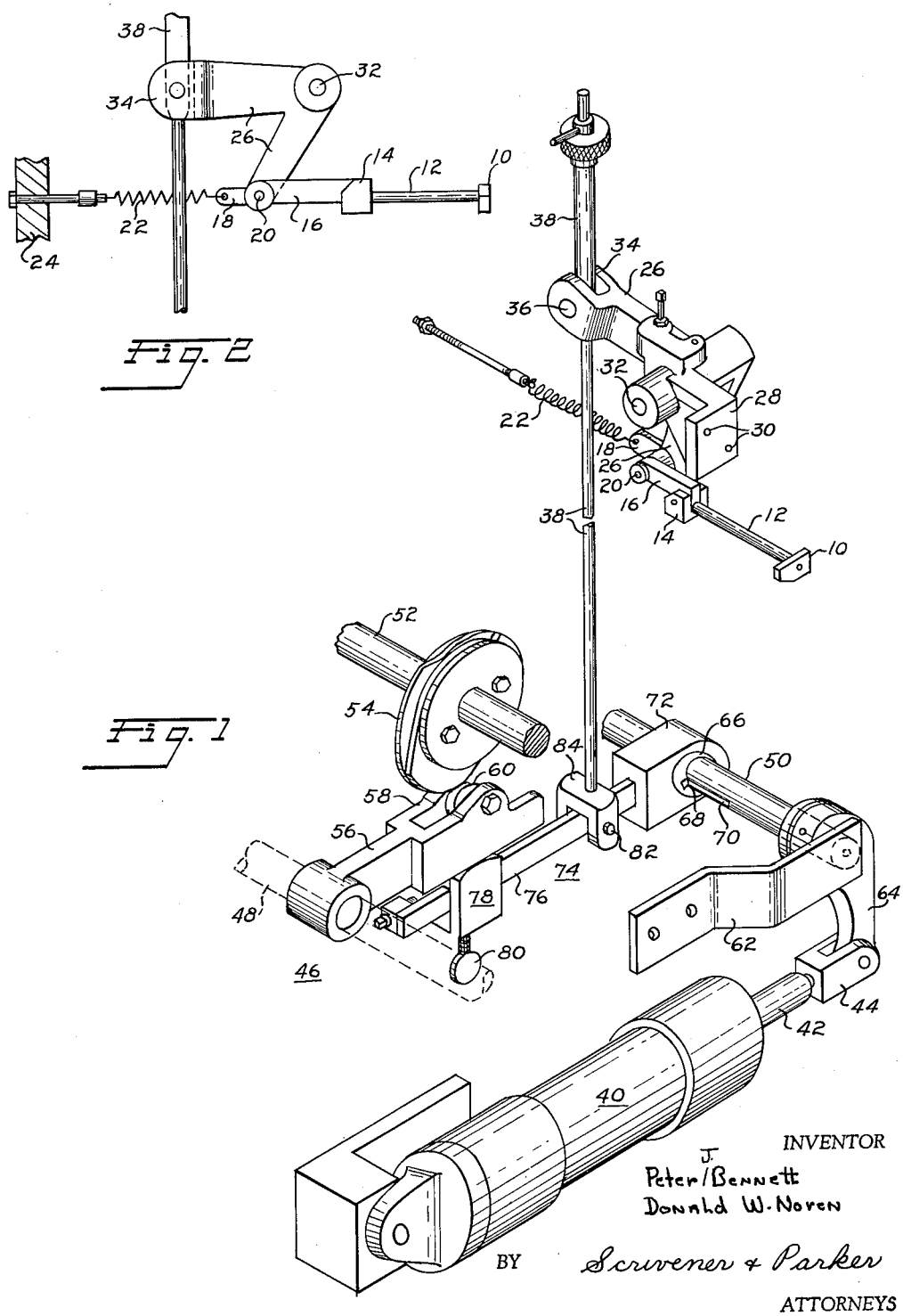

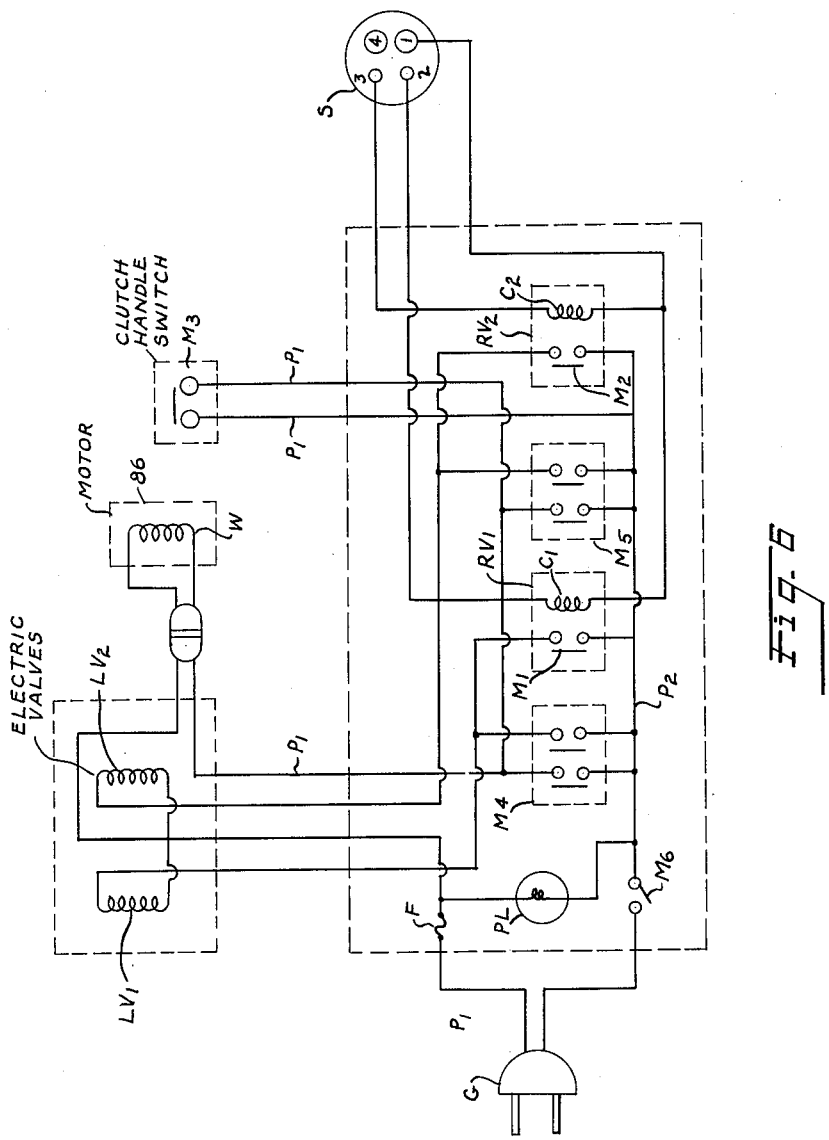

3,127,922
PITCH CONTROL DEVICE FOR SPRING COILING MACHINE
Peter J. Bennett, 1000 Bell Ave., Mattoon, Ill., and Donald W. Noren, 9144 N. Mason Ave., Morton Grove, Ill.
Filed June 1, 1961, Ser. No. 114,166
3 Claims. (Cl. 153—64)

This invention relates to automatic pitch control means and more particularly to pitch control means for automatic spring coiling machines wherein the pitch control means is automatically adjusted to compensate for variations in the free length of successive helical spring units.

In automatic spring coiling machines means are usually provided for sorting the helical spring units as to length, which may vary from a desired value depending on wire characteristics or the like, and signals can be derived from said sorting means which are indicative of the variations in the length of successively manufactured helical spring units.

It is a primary object of this invention to provide an automatic pitch control means whereby a spring coiling process may be carried out at a predetermined setting over any desired number of successively fabricated helical spring units and the spring units will all be automatically maintained within predetermined free length tolerances.

Another object of this invention is to provide an automatic pitch control means for automatic spring coilers having a hydraulic actuating system controlled by an electrically responsive control unit energized in response to the signal output of the spring length detecting and sorting means, whereby the pitch setting for successive helical spring units is automatically changed in response to variations in the free length of the preceding spring units.

A spring coiling machine of the type employed in carrying out the present invention is disclosed in the patent to Bergevin and Nigro, No. 2,119,002. A device for sorting springs according to the free length thereof is disclosed in the patent to Wintle and Strom, No. 2,841,284.

These and other objects of the invention will become more apparent with reference to the following specification and drawings which relate to a preferred embodiment of the invention.

Figure 3:
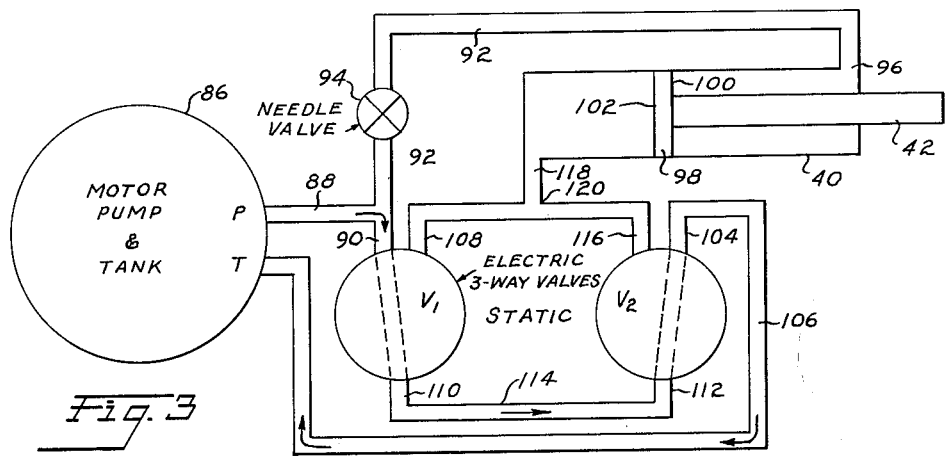
Figure 4:
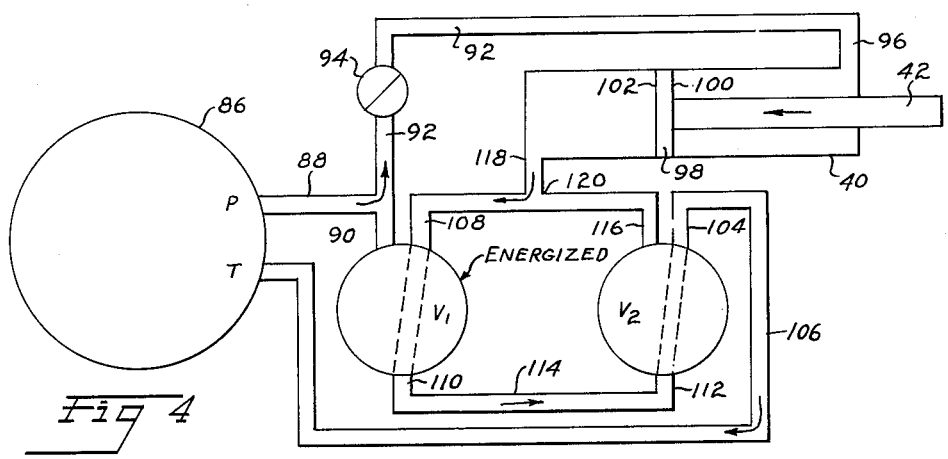
Figure 5:
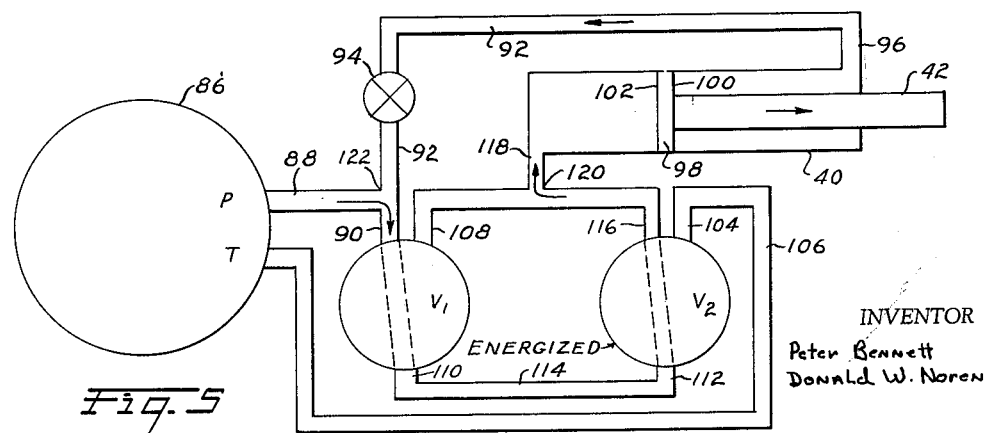

In the drawings:
FIGURE 1 is a perspective view of the invention;
FIGURE 2 is a detail of FIGURE 1;
FIGURE 3 is a schematic diagram showing one operating position of the hydraulic actuating system;
FIGURE 4 is a schematic diagram showing another operating position of the hydraulic actuating system;
FIGURE 5 is a schematic diagram showing another operating position of the hydraulic actuating system; and
FIGURE 6 is a schematic diagram of the electrical control circuit.

Basically, an automatic free length responsive sorting means is provided in conjunction with a spring coiling machine which receives and classifies the helical springs as they are successively completed and means are provided in the sorting means for generating an electrical output signal in response to an increase or decrease of the free length of the springs above or below, respectively, a given prescribed range of tolerances. The invention provides electrically responsive control means which control the energization of a hydraulic actuator in response to the output signals from the sorting means. Depending on the condition reflected by the signals from the sorting means the control and hydraulic systems automatically adjust the pitch control of the coiling machine whereby the spacing between successive convolutions and hence, the free length, of each helical spring unit is corrected to within the desired tolerance.

*The Pitch Control Linkage*

Referring in detail to the drawings, and more particularly to FIGURES 1 and 2, a wedge-shaped pitch control tool 10 is shown mounted on the tip of a rod 12 transversely with respect to the longitudinal axis thereof.

The rod 12 is adjustably secured in a socket type clamp 14 which is affixed to one end 16 of a lever having the other end 18 thereof disposed on the opposite side of a pivot pin 20 located intermediate the two ends. The said other end 18 is coupled through a spring 22 to a solid support generally shown at 24 in FIGURE 2 whereby the pitch rod and tool are held in a generally horizontal relationship with respect to the apparatus as shown in FIGURE 1 for short motions of the pitch tool along the longitudinal axis of the rod 12.

The pivot pin 20 is located on one end of a bell crank lever 26 which is pivotally journalled at its apex to a fixed bracket 28, having suitable holes 30 therein for the reception of mounting bolts or the like (not shown), about a pivot axis 32. At the other end of the bell crank 26 is an integral yoke member 34 having a connecting pin 36 extending from one ear of the yoke to the other. The connecting pin 36 also extends through a pitch tool actuating rod 38 which extends through a linkage hereinafter described to a hydraulic actuating system.

The motive power means of the hydraulic actuating system comprises a hydraulic cylinder 40 having an output rod 42 with a yoke and pin coupling 44 at the outer end thereof.

The hydraulic cylinder 40 energizes a pitch tool adjusting linkage generally indicated at 46. This linkage comprises first and second rock-shafts 48 and 50, respectively, and a cam shaft 52 carrying pitch setting cams 54, all of which are substantially interconnected by a plurality of rocker-arms and eccentric connections to be hereinafter described.

Mounted on the first rock-shaft 48 and extending radially therefrom is a first rocker-arm 56 which includes, at its outer extremity, a yoke 58 in which is mounted a cam follower 60. The cam follower 60 is in engagement with the pitch setting cams 54 and is adapted to be selectively positioned thereby about the axis of the rock-shaft 48.

The second rock-shaft 50 is journalled at one end in a spring type bracket 62 adjacent the yoke coupling 44 on the output rod 42 of the hydraulic cylinder 40.

The second rock-shaft 50 is connected to the yoke coupling 44 by a second rocker-arm 64 fixed to the rock-shaft 50 and extending to the yoke coupling 44 to which it is pivotally connected. Thus, movement of the output rod 42 into and out of the hydraulic cylinder 40 acts through the yoke coupling 44 and second rocker-arm 64 to rock the second rock-shaft 50 about its own longitudinal axis in a corresponding direction.

Intermediate the ends of the second rock-shaft 50 is mounted a circumferentially disposed eccentric 66 which is held on the shaft 50 by means of a key 68 and keyway 70. The eccentric 66 is enclosed by a sleeve type coupling 72 comprising a portion of a third rocker-arm 74 having an elongated shank portion 76 extending radially outward with respect to the second rock-shaft 50 from the sleeve coupling 72 to a point immediately adjacent the lower edge of the yoke 58 on the outer end of the first rocker arm 56.

A second cam follower 78 is adjustably mounted, by means such as an adjustable lock screw 80, for sliding movement along the elongated shank 76 in juxtaposition with the lower edge of the yoke 58 on the first rocker arm 56. The sliding adjustment provides for various degrees of relative movement of the first and third rocker-arms 56 and 74, respectively.

The entire control linkage 46 is connected to the pitch tool actuating rod 38 by means of a pin 82 extending through the shank 76 of the third rocker-arm 34 and connected with a yoke member 84 integral with the lower end of the pitch tool actuating rod 38.

*The Hydraulic Actuating System*

Referring now to FIGURES 3, 4 and 5, the hydraulic system is schematically shown to include a motor-pump and tank unit 86 having a pump outlet P and a tank return or reservoir entrance T therein.

The pump outlet P is connected directly through a fluid line 88 to a first inlet port 90 of a valve V-1 and through a branch line 92 and needle valve 94 to a first inlet-outlet port 96 in the hydraulic cylinder 40 in that part of the cylinder including the rod carrying side 100 of the piston 98.

The piston 98 in the hydraulic cylinder has an area ratio of two (2) to one (1) between the plain face 102 and the rod carrying side 100 thereof. Thus, if both ends of the cylinder are simultaneously supplied with fluid from the pump 86 the piston 98 will move so as to further project the rod 42 out of the cylinder 40.

The cylinder 40 is fed selectively by two valves V-1 and V-2 which are solenoid operated and provide a three-way control function.

In the neutral or static condition of the cylinder 40, the valves V-1 and V-2 are both biased to a position wherein they are connected, respectively, to the pump outlet P and the tank inlet T. This connection has already been described for the valve V-1. The second valve V-2 is connected through an outlet port 104 through the tank line 106 to the tank inlet T.

The first valve V-1 is provided with two inlets 90 and 108 and a single outlet 110 while the second valve V-2 is provided with a single inlet 112, connected with the outlet 110 of the first valve V-1, by a line 114, and a pair of outlets 104 and 116. Since only one flow passage is present in each valve, the selectivity of the flow therethrough is limited to two positions in each valve, three combinations of which are all that are necessary for complete hydraulic actuation of the invention.

The static operating condition described above is shown in FIGURE 3 with the flow to the cylinder 40 bypassed from the pump outlet P through line 88, inlet 90 of the first valve V-1, the outlet 110 of the first valve, line 114, the inlet 112 of the second valve V-2, outlet 104 of the second valve and tank line 106 back to the tank inlet T.

Before describing the two energized operating conditions of the hydraulic system it should be noted that the other inlet 108 of the first valve V-1 and the other outlet of the second valve V-2 are mutually connected with a second inlet-outlet port 118 on the end of the cylinder 40, opposite the first port 96, by a T-connection 120.

Referring now to FIGURE 4, the valve positions necessary to move the piston 98 and rod 42 into the cylinder 40 are shown.

The second valve V-2 is in the same position as in the static condition of FIGURE 3. On the other hand, the first valve V-1 is shifted so as to connect the other inlet port 108 with the outlet 110 thereof. This provides an exhaust circuit for that end of the cylinder 40 enclosing the plain face 102 of the piston 98 by way of the second inlet-outlet port 118, T-connection 120 first valve V-1, line 114, second valve V-2 and the tank line 106 back to the tank inlet T. The other end of the cylinder 40, however, is fed with fluid from the pump port P through line 88, line 92, needle valve 94 and the first inlet-outlet port 96. The pressure differential created moves the piston 98 and rod 42 farther into the cylinder 40.

The third operational condition of the hydraulic system is shown in FIGURE 5. In this condition the first valve V-1 is in the same position as shown for the static condition of FIGURE 3. The second valve V-2, however, is shifted such that its other outlet 116 is connected with its inlet 112. This creates a fluid flow path from the pump port P, line 88, valve V-1, line 114, valve V-2, T-connection 120, and second inlet-outlet port 118 into the end of the cylinder 40 including the plain face 102 of the piston 98.

The other end of the cylinder 40 exhausts through the first inlet-outlet port 96, line 92, needle valve 94 and second T-connection 122, between lines 88, 92 and inlet 90 of the first valve V-1, back through the valve V-1 to form a closed fluid circuit with both ends of the cylinder 40. Thus, the reason for the differential area is apparent as the piston 98 and rod 42 will move out of the cylinder 40 by virtue of the greater force exerted by the fluid on the plane face of the piston 98.

*The Electric Control System*

Referring now to FIGURE 6, the solenoids for energizing the first valve V-1 and the second valve V-2 of the hydraulic system are indicated by LV-1 and LV-2, respectively.

A pair of control relays RV-1 and RV-2 are provided to control the valve solenoids LV-1 and LV-2, respectively. These relays are connected across output lead pairs 1 and 2 and 1 and 3, respectively, which carry the free length variation signals from the spring sorting unit generally indicated at S.

Suitable electric power is fed from a source G through a pair of common power leads P-1 and P-2. These common leads supply the necessary power for the valve solenoids LV-1 and LV-2 and the electric motor in the motor-pump unit 86. The power for the control relays RV-1 and RV-2 which is supplied, respectively, to the actuating coils C-1 and C-2 thereof is provided by the output signals from the sorting unit S. Each of the respective actuating coils C-1 and C-2 has associated therewith the normally open contacts of a relay. Coil C-1 and one pair of contacts form one relay M-1 and coil C-2 and a second pair of contacts form a second relay M-2.

The relay M-1, when closed, connected the solenoid LV-1 of the first valve V-1 across the power leads P-1 and P-2 to thereby shift the first valve to the position connecting inlet 108 thereof to the outlet 110 as shown in FIGURE 4.

The relay M-2, when closed, connects the solenoid LV-2 of the second valve V-2 across the power leads P-1 and P-2 to thereby shift the second valve to the position connecting inlet 112 thereof to the outlet 116 as shown in FIGURE 5.

When the solenoids LV-1 and LV-2 are deenergized the valves V-1 and V-2 are normally biased to the positions shown in FIGURE 3.

The motor windings W in the motor-pump unit 86 are connected directly in the first power lead P-1 as is a manually operated microswitch M-3 which may be mounted in a clutch handle or the line (not shown) for selectively clutching the entire spring coiling machine (not shown) operation, which automatically energizes the motor pump unit in response to the on-off cycles of the coiling machine.

Two sets of microswitch pairs M-4 and M-5 are associated respectively, one set with each of the valve solenoids LV-1 and LV-2 and the motor windings W. These are manually actuated whereby the hydraulic system may be manually indexed to the static condition shown in FIGURE 3 by selectively energizing one or the other of said valve solenoids.

A fuse F is shown in power lead P-1 and a master on-off switch M-6 is located in power lead P-2. A pilot light PL is connected across the power leads on the off sides of the fuse F and on-off switch M-6 whereby a visible indication is provided when power is supplied to the circuit.

Operation

The pitch control tool 10 is initially set in a predetermined position corresponding to a desired pitch and free length of the helical spring units to be manufactured on the coiling machine (not shown) by rotating cam shaft 52 to thereby position the control cams 54. This causes the cam follower 60 on the first rocker-arm 56 to depress the rocker arm 56 and yoke 58 thereon whereby the lower surface of the yoke 58 exerts a downward force on the second cam follower 78, engaged therewith, which is adjustably mounted on the shank 76 of the third rocker-arm 74.

This causes the sleeve 72 on the third rocker-arm 74 to pivot about the eccentric 66 on the second rock-shaft 50 and thereby raise or lower the pitch tool actuating rod 38 in accordance with the movement of the elongated shank 76 to effect the desired adjustment of the pitch tool. This, as described hereinbefore, is accomplished through a bell-crank 26 attached to the upper end of the actuating rod 38.

At this point in the operation, the hydraulic system has been adjusted to the desired position in the static condition shown in FIGURE 3 to position the second rock shaft 50 in a fixed neutral position by way of the piston rod 42 and the second rocker-arm 64.

The coiling operation is now begun and the sorter S is energized. As the spring units manufactured pass through the sorter, any variation in length is detected and, referring to FIGURE 3, an output signal indicative thereof is generated across lines 1 and 2 or lines 1 and 3 depending on whether the free length variation is greater than or less than the desired length tolerance.

Thus, either relay RV-1 or RV-2 will be energized depending on the type of variation detected and as previously described with respect to FIGURES 4 and 5 the piston rod 42 will be moved in one direction or the other in response to the closing of one or the other of these relays.

The movement of the piston rod 42 will move the second rocker-arm 64 and cause the second rock-shaft 50 to rotate in a corresponding direction. Since the eccentric 66 is keyed to the second rock-shaft 50 this will be rotated within the sleeve 72 on the third rocker-arm 74.

The fulcrum of motion of the rocker-arm is thus shifted from the eccentric 66, previously held fixed, to the second cam follower 78 which was previously moved to effect the adjustment. This causes a corrective movement of the elongated shank portion 76 of the third rocker-arm 74 with respect to the reference adjustment of the pitch control cams 54.

Thus, as previously described, any movement of the shank 76 is automatically reflected in the pitch tool actuating arm 38 and consequently, in the pitch tool 10, itself.

This continuous automatic adjustment process actually results in a substantially uniform series of spring units since the adjustments occur at a rate sufficient to prevent any marked deviation from the original pitch, and consequently free length, setting.

As can be seen from the foregoing specification and drawings, this invention provides a highly effective and efficient pitch control for automatic coilers including a novel combination of electric-hydraulic servo system with a pitch tool setting and adjusting linkage.

It is to be understood that the embodiment shown and described herein is for the purpose of example only and is not intended to limit the scope of the appended claims.

What is claimed is:

1. An adjustable pitch control tool for spring coiling machines including means for initially setting said pitch control tool for a predetermined coil pitch, said means comprising a rotatable shaft, a radial arm mounted on said shaft and means for engaging the outer end of said arm to provide an initial predetermined pitch reference setting, additional means for varying the actual pitch setting above and below said predetermined pitch reference setting in corrective amounts comprising an eccentric keyed to the shaft on which said radial arm is mounted, a bearing sleeve on said radial arm enclosing said eccentric, and means to rotate said shaft to vary the angular position of said eccentric about the axis thereof whereby the inner end of said arm is moved to effect a corrective pitch adjustment about the reference position of the outer end thereof.

2. In a helical spring coiling machine for manufacturing successive helical springs of a predetermined free length, a coil pitch setting tool, a spring sorting means for detecting variations of springs from the predetermined free length, and means for automatically adjusting said pitch setting tool to thereby control the free length of said springs, comprising, signal generating means in said sorting means for producing an electrical output signal in response to a variation in the free length of a spring from a predetermined setting of said sorting means, electrically responsive means selectively actuated by said output signal, hydraulic means controlled by said electrically responsive means, an adjustable linkage connecting said pitch setting tool to said hydraulic means, said linkage being selectively positioned by said hydraulic means to adjust said pitch tool in response to said output signals from said sorting means to thereby maintain the free length of each spring within the limits of a pre-determined setting, said hydraulic means including a hydraulic cylinder with a piston rod extending therefrom and adapted for rectilinear movement therein, and said linkage comprising first and second generally parallel rock shafts, a first rocker arm on said first shaft, second and third rocker arms on said second shaft, all of said rocker arms extending radially from said shafts, a pitch tool actuating rod connected intermediate the ends of said third rocker arm and connected to said pitch tool through a pivoted bell crank for adjusting said pitch tool in accordance with movements of said third rocker arm, said third rocker arm being journaled eccentrically on said second rock shaft at one end and having the outer end thereof in juxtaposition to said first rocker arm, pitch setting means acting on said first rocker arm to provide a predetermined pitch setting, said hydraulic means being connected through said piston rod and said second rocker arm to rotate said second rock shaft and vary the position of said third rocker arm through said eccentric connection whereby said pitch tool actuating arm is adjusted with respect to the predetermined pitch setting to correct for any variation in free length.

3. In a helical spring coiling machine for manufacturing successive helical springs of a predetermined free length, a coil pitch setting tool, a spring sorting means for detecting variations of springs from the predetermined free length, and means for automatically adjusting said pitch setting tool to thereby control the free length of said springs, comprising, signal generating means in said sorting means for producing an electrical output signal in response to a variation in the free length of a spring from a predetermined setting of said sorting means, electrically responsive means selectively actuated by said output signal, hydraulic means controlled by said electrically responsive means, an adjustable linkage connecting said pitch setting tool to said hydraulic means, said linkage being selectively positioned by said hydraulic means to adjust said pitch tool in response to said output signals from said sorting means to thereby maintain the free length of each spring within the limits of a predetermined setting, said hydraulic means comprising a pump and tank unit having a pump outlet and a tank return inlet, a hydraulic actuating cylinder including a piston and a rod mounted thereon, said rod extending out of said cylinder wherein the operating fluid therefor is supplied by said pump and tank unit, first and second valve means selectively interconnected between said cylinder and said unit across the outlet and return inlet thereof, said valve means having three operating combinations of valve positions, each of said valves comprising a valve body having a single flow passage therethrough, a common flow port at one end of each said body comprising an outlet port in said first valve and an inlet port in said second valve interconnected one with the other by a flow line, a pair of inlet ports in said first valve, a pair of outlet ports in said second valve, one port of said pair of inlet ports in said first valve and one port of said pair of outlet ports in said second valve being connected to one end of said cylinder by a T-connected flow line, the other port of said pair of inlets in said first valve being connected by a second T-connected flow line to said pump outlet and the other end of said cylinder, and the other port of said pair of outlets in said second valve being connected directly to said tank return inlet, said piston having an area on one side thereof equal to twice the area on the rod carrying side whereby equal volumes of fluid supplied to both sides of the piston will cause the rod to move farther out of the cylinder, the selective operating conditions of said cylinder including a static position wherein said pump outlet is by-passed directly through said valves to said tank return, a first energized position wherein the rod carrying end of the cylinder is supplied from said pump outlet and the other end is exhausted by said tank return inlet through said valves, and a second energized position wherein both ends of said cylinder are connected in a closed circuit with said pump inlet through said valves to supply equal volumes of fluid to both ends of said cylinder through said T-connected flow lines to thereby move said rod out of said cylinder.

References Cited in the file of this patent

UNITED STATES PATENTS

| | | |
|---|---|---|
| 2,455,863 | Halvorsen | Dec. 7, 1948 |
| 2,831,524 | Bache | Apr. 22, 1958 |
| 2,845,987 | McCullough | Aug. 5, 1958 |
| 2,923,343 | Franks | Feb. 2, 1960 |